April 21, 1959
W. F. BORN
2,883,637
BUS DUCT
Filed Dec. 15, 1954
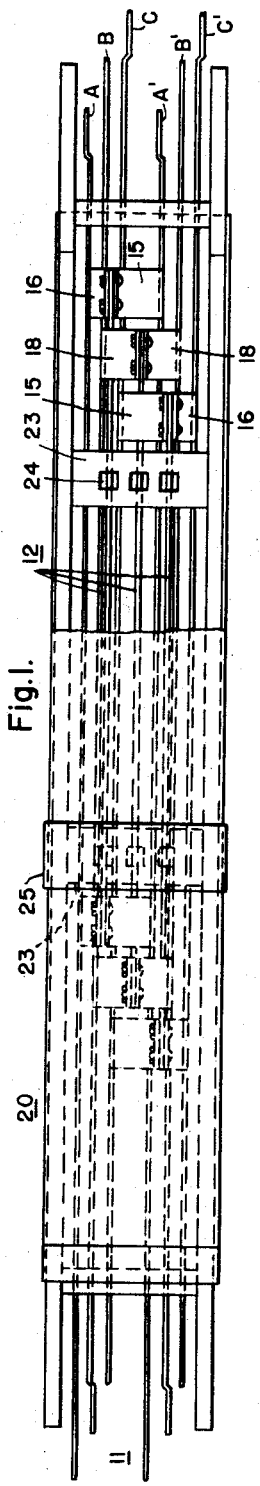
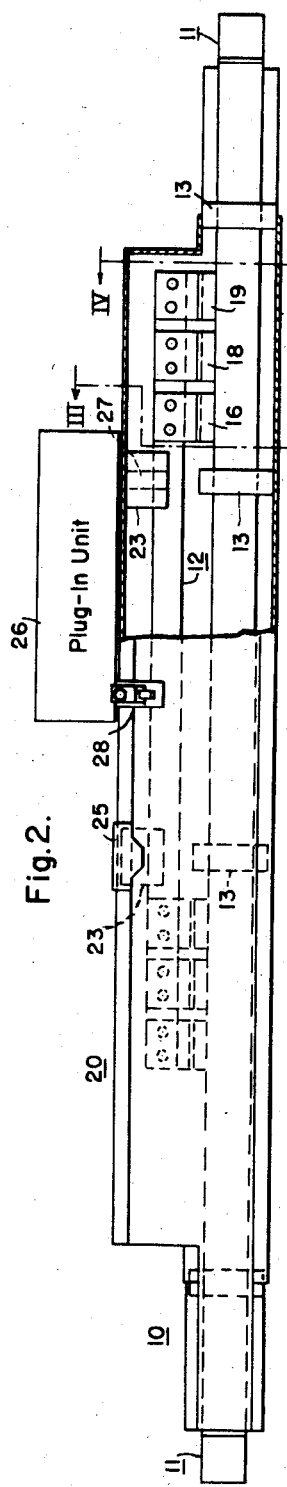
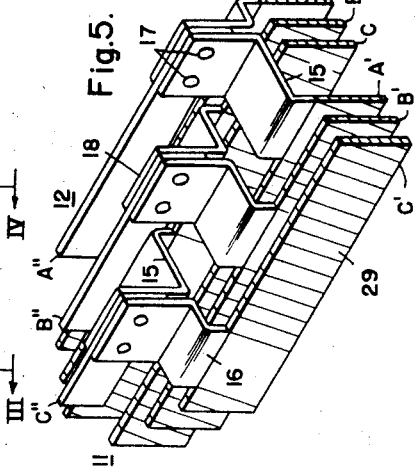
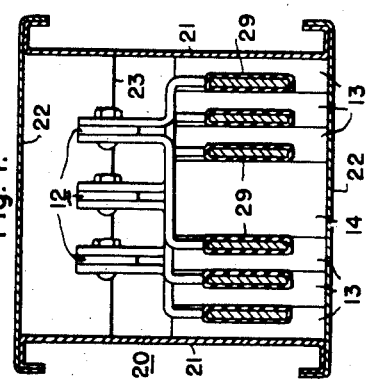
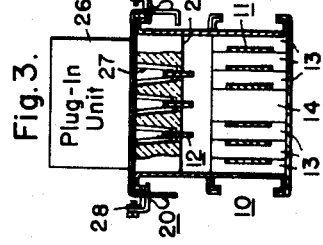
INVENTOR
William F. Born.
BY
ATTORNEY 200000
United States Patent Office 2,883,637
Patented Apr. 21, 1959

2,883,637

BUS DUCT

William F. Born, Beaver, Pa., assignor to Westinghouse Electric Corporation, East Pittsburgh, Pa., a corporation of Pennsylvania Application December 15, 1954, Serial No. 475,332

5 Claims. (Cl. 339—22)

My invention relates, generally, to bus duct for electrical distribution systems and, more particularly, to current-take-off or tap sections for bus duct of the low-impedance or feeder type.

Low-impedance bus duct is usually utilized for long feeder runs where low-voltage drop is an important factor. One form of low-impedance duct comprises two or more insulated copper bars per phase, supported in closely spaced relation by hard wood blocks clamped together around the bars for all phases and mounted in a metal housing.

Heretofore, no outlets have been provided in the housing where current take-off or plug-in devices can be readily attached. Therefore, the entire circuit must be shut off for safety when a cable tap box or an overcurrent protective device is installed. This either disrupts production or the work must be done after regular working hours.

An object of my invention is to provide for attaching removable plug-in or current take-off devices to bus duct of the low-impedance or feeder type.

Another object of my invention is to provide a plug-in bus duct length or section which can be installed in a low-impedance bus duct structure at any desired location along the structure.

It is also an object of my invention to provide a main run of bus bars having close spacing between certain bars to give low impedance, with secondary bars having a wider spacing sufficient to receive V-shaped stab connectors engaging opposite sides of the secondary bars.

An additional object of my invention is to provide in a run of low-impedance bus duct having bus bars with an insulating covering, extensions having uninsulated portions for receiving stab connectors of plug-in units.

A further object of my invention is to provide for utilizing plug-in units on the plug-in section which are interchangeable with plug-in units provided for plug-in bus duct.

Still another object of my invention is to provide connectors for connecting bus bars disposed in two levels.

Other objects of my invention will be explained fully hereinafter or will be apparent to those skilled in the art.

In accordance with one embodiment of my invention, a section or length of bus duct which can be installed at any place in a run of low-impedance duct has plug-in bus bars connected in parallel with the low impedance bus bars. Two openings are provided in the housing for the plug-in bars to permit the installation of plug-in units on the plug-in housing section without shutting off the power.

For a better understanding of the nature and objects of the invention, reference may be had to the following detailed description, taken in conjunction with the accompanying drawing, in which:

Figure 1 is a view, in plan, of a length of bus duct embodying the principal features of the invention, a portion of the duct housing being broken away for clearness;

Fig. 2 is a view, partly in elevation and partly in section, of the structure shown in Fig. 1;

Fig. 3 is a view, in section, taken along the line III—III in Fig. 2;

Fig. 4 is an enlarged view, in section, taken along the line IV—IV in Fig. 2, the bus bars being shown insulated; and Fig. 5 is an enlarged isometric view of a portion of the bus bars utilized in the structure.

Referring to the drawing, the structure shown therein comprises a length of low-impedance bus duct which, in general, may be of the type described in Patent 2,653,991, issued September 29, 1953, to L. W. Dyer and W. F. Born. However, some of the broader aspects of the invention are applicable to low impedance or feeder duct of other types. The bus duct structure comprises a generally rectangular sheet metal housing 10 inside of which are disposed two sets of three-phase bus bars 11 which are supported by a plurality of groups in insulating blocks 13 and 14. The corresponding phases of the two sets of bus bars 11 are designated A, B and C and A', B' and C'. In order to reduce the overall impedance the bus bars in each set are spaced relatively closely together, and the structure is commonly known as low-impedance or feeder bus duct. Because of the close spacing, each main bus bar 11 is wrapped with insulating tape or otherwise coated with insulation 29.

The insulating blocks 13 and 14 may be composed of hard wood, and the blocks of each group are clamped together by bolts extending through the blocks in the manner described in the aforesaid patent. As shown in Fig. 2 the groups of blocks may be spaced along the bus bars 11 to provide the necessary support for the bus bars.

Heretofore it has not been considered practical to provide current take-off or plug-in devices for utilization with low-impedance bus duct since the main bus bars 11 are spaced closely together and because of the physical phase arrangement of the bars to give low impedance. Also, the close spacing of the bars in some types of low-impedance bus duct often makes it necessary or desirable that the bars be covered with insulation so that they cannot be engaged by the stabs of plug-in units. In order to permit the utilization of plug-in devices with low-impedance bus duct I have provided plug-in or secondary bus bars 12 which are preferably disposed with their wide faces parallel to the wide faces of the main bus bars 11 and with their longitudinal center lines in a transverse plane parallel to the transverse plane through the longitudinal center lines of the main bus bars 11, and which are spaced laterally at distances corresponding to the spacing between the bus bars of the bus duct of the plug-in type. The spacing between the secondary or plug-in bars 12 is greater than between the main or low-impedance bars 11 and is sufficiently great that the bars 12 need not be covered with insulation, or at least they may be uninsulated where they are to be engaged by the stabs of the plug-in units.

As shown most clearly in Fig. 5, one of the secondary bus bars 12, designated A", is connected to the two main bus bars A and A' by two generally Z-shaped connectors 15 and 16. The connector 15 has the end edge of one leg brazed, welded or otherwise connected with an intermolecular bond to one edge of the bus bar A' and another leg attached to the bus bar A". Likewise, the connector 16 has the end edge of one leg brazed or welded to one edge of the bus bar A and another leg attached to the bus bar A" by bolts or rivets 17 which extend through the connectors 15 and 16 and the bus bar A".

The secondary bus bar B" is connected to the two main bus bars B and B' by two connectors 18 which may be identical in shape and having their legs connected to the bus bars in the same manner as the connectors 15 and 16. The secondary bus bar C" is connected to the main bus bars C and C' by connectors 15 and 16 which are connected to the bus bars in the manner previously described with the exception that the connectors are interchanged in their relative positions in the structure. The opposite ends of the plug-in or secondary bus bars A", B" and C" are similarly connected to the same bars A, A', B, B', and C, C' respectively, of the main or low-impedance bus bars so as to be electrically in parallel therewith. The connectors may be taped after they are connected to the bus bars.

As shown, the secondary bus bars 12 are disposed in an offset or enlarged portion 20 of the housing 10. The housing portion 20 comprises oppositely disposed flanged channel members 21 having channel members 22 attached thereto in the manner described in the aforesaid patent. One of the channel members 22 has one or more, in this instance two, openings provided therein for receiving plug-in units extending into the housing 20. An insulator 23 is provided inside the housing 20 at each one of the openings. The insulator 23 has three openings 24 therein for receiving the stab connectors of the plug-in unit. Cover plates 25 are provided for the openings for the plug-in units. A plate may be removed or slid sidewise along the channel when a plug-in unit is to be installed.

As shown in Fig. 2, one plug-in unit 26 is installed on the housing 20. An additional plug-in unit may be installed at the other opening in the housing if it is so desired. The plug-in unit may be generally of the type described in Patent 2,641,636, issued June 9, 1953, to W. F. Born and J. C. Langaunet. As described in the aforesaid patent, the plug-in unit comprises a metal housing having a circuit interrupting device mounted inside the housing and provided with contact members 27 which engage the secondary bus or stab connectors 27 which engage the secondary bus bars 12 when the plug-in unit is installed on the housing 20 in the manner shown. The plug-in device is removably secured to the housing by clamps or other fastening devices 28. In this manner the interrupting device is connected to the bus bars, and conductors may be connected to one set of terminals on the interrupting device to supply power to power consuming devices.

As shown in Fig. 2, the secondary bus bars 12 are connected to the main hus bars 11 by two sets of connectors. Thus, the secondary bus bars are rigidly supported in the housing. Furthermore, sufficient current may be conducted through the connectors to supply the power taken through the plug-in units.

The present length or section of bus duct is so constructed that it may be connected in a run of low-impedance bus duct at each floor in a vertical run of duct or at any desired location in a horizontal run of duct. The ends of the main bus bars 11 are so shaped and spaced that they may be connected to corresponding bars of low-impedance duct manufactured by the same manufacturer as the present duct. Furthermore, the plug-in portion of the structure is similar to the standard plug-in duct manufactured by the same manufacturer. Therefore, standard plug-in units which are interchangeable with other plug-in units may be utilized.

From the foregoing description it is apparent that I have provided for connecting plug-in devices to a run of low-impedance or feeder bus duct without it being necessary to shut off the power from the duct to permit the plug-in units to be installed. The length of bus duct herein described may be installed at any desired point in a run of low impedance or feeder duct, thereby making it possible to attach plug-in units at any desired location in an installation of bus duct.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a multi-phase bus duct, in combination, a housing, a plurality of main conductors including more than one conductor for each of one or more phases disposed in the housing, a connector for each one of the main conductors, said connectors having elongated substantially rigid extensions extending parallel to the main conductors and having their longitudinal center lines lying in the same plane, at least one of said extensions being joined to more than one connector, said housing having one or more openings therein opposite said extensions for receiving stab connectors of plug-in devices to engage the extensions.

2. In a multi-phase bus duct, in combination, a housing of a generally rectangular cross section, a plurality of main conductors for each phase disposed in the housing with their longitudinal center lines lying in the same plane, an elongated substantially rigid single secondary conductor for each phase, said secondary conductors having their longitudinal center lines lying in a plane parallel to the plane through the longitudinal center lines of the main conductors, connectors for connecting at least two of the main conductors for each phase to the single secondary conductor for the corresponding phase, an enlarged portion in said housing for said secondary conductors, said enlarged portion having openings therein over the secondary conductors providing access to said secondary conductors, and insulators inside of the housing at said openings, said insulators having openings therein disposed in alignment with the secondary conductors.

3. In a multi-phase bus duct, in combination, a housing of a generally rectangular cross section, a plurality of main conductors for each phase disposed in the housing with their longitudinal center lines lying in the same plane, an elongated single secondary conductor for each phase, said secondary conductors being parallel to each other and having their longitudinal center lines lying in a plane parallel to the plane through the longitudinal center lines of the main conductors, a generally Z-shaped connector for connecting each main conductor for each phase to the single secondary conductor for the corresponding phase, each connector having one leg attached to a main conductor and another leg attached to a single secondary conductor, said connectors being arranged in pairs with oppositely disposed legs of each pair attached to the same conductor, said housing having an opening therein over the secondary conductors, and said secondary conductors being accessible from exteriorly of the housing through said opening.

4. In a multi-phase bus duct, in combination, an elongated housing, a plurality of elongated main conductors for each phase disposed in the housing and having wide faces extending longitudinally of the housing, some of said main conductors being spaced closely together to give low impedance, a single substantially rigid elongated secondary conductor for each phase, said secondary conductors being parallel to each other and equally spaced farther apart than the closely spaced main conductors and having their longitudinal center lines lying in a plane and having wide faces extending along the housing parallel to wide faces of the main conductors, a connector for connecting each main conductor to a secondary conductor of the corresponding phase, said housing having an opening therein over the secondary conductors, and said secondary conductors being accessible from exteriorly of the housing through said opening for engagement of their wide faces by stab connectors of plug-in devices.

5. In a multi-phase bus duct, in combination, an elongated housing, a plurality of elongated main conductors for each phase disposed in the housing with wide faces extending longitudinally of the housing, some of said main conductors being spaced closely together and having solid insulation between adjacent portions thereof, a single substantially rigid elongated secondary conductor for each phase, said secondary conductors being equally spaced farther apart than the closely spaced main conductors and having bare portions, said secondary conductors being parallel to each other and having wide faces extending along and parallel to wide faces of the main conductors, the longitudinal center lines of the secondary conductors lying in the same plane, and a connector for connecting each main conductor to a secondary conductor of the corresponding phase, said housing having one or more openings therein over the secondary conductors providing access to bare portions of wide faces of the secondary conductors for engagement by stab connectors of plug-in devices.

References Cited in the file of this patent

UNITED STATES PATENTS

| | | |
|---|---|---|
| 895,362 | Goldschmidt | Aug. 4, 1908 |
| 2,317,710 | Anderson | Apr. 27, 1943 |
| 2,318,861 | Hugulet | May 11, 1943 |
| 2,411,128 | Carlson | Nov. 12, 1946 |
| 2,641,636 | Born et al. | June 9, 1953 |
| 2,653,991 | Dyer et al. | Sept. 29, 1953 |